United States Patent
Häger et al.

(10) Patent No.: US 10,412,273 B2
(45) Date of Patent: Sep. 10, 2019

(54) SMART NON-UNIFORMITY CORRECTION SYSTEMS AND METHODS

(71) Applicant: FLIR Systems AB, Täby (SE)

(72) Inventors: Pontus Häger, Bromma (SE); Katrin Strandemar, Rimbo (SE)

(73) Assignee: FLIR SYSTEMS AB, Täby (SE)

( * ) Notice: Subject to any disclaimer, the term of this patent is extended or adjusted under 35 U.S.C. 154(b) by 0 days.

(21) Appl. No.: 15/912,770

(22) Filed: Mar. 6, 2018

(65) Prior Publication Data

US 2018/0262658 A1   Sep. 13, 2018

Related U.S. Application Data

(60) Provisional application No. 62/470,807, filed on Mar. 13, 2017.

(51) Int. Cl.
| | |
|---|---|
| *H04N 5/217* | (2011.01) |
| *G05D 1/02* | (2006.01) |
| *G06T 7/70* | (2017.01) |
| *H04N 5/33* | (2006.01) |
| *H04N 5/365* | (2011.01) |

(52) U.S. Cl.
CPC ......... *H04N 5/2176* (2013.01); *G05D 1/0253* (2013.01); *G06T 7/70* (2017.01); *H04N 5/33* (2013.01); *H04N 5/365* (2013.01); *G06T 2207/10048* (2013.01)

(58) Field of Classification Search
CPC .......... H04N 5/2176; H04N 5/33; G06T 7/70; G06T 2207/10048; G05D 1/0253
See application file for complete search history.

(56) References Cited

U.S. PATENT DOCUMENTS

| | | | |
|---|---|---|---|
| 8,208,755 B1 | 6/2012 | Hogasten | |
| 9,900,526 B2 * | 2/2018 | Kostrzewa | ........... H04N 5/2253 |
| 2009/0257679 A1* | 10/2009 | Hogasten | .................. G06T 5/50 |
| | | | 382/275 |
| 2013/0147966 A1* | 6/2013 | Kostrzewa | ............... H04N 5/33 |
| | | | 348/164 |
| 2013/0250102 A1 | 9/2013 | Scanlon et al. | |
| 2014/0270563 A1* | 9/2014 | Bailey | ..................... G06T 5/005 |
| | | | 382/254 |
| 2015/0296146 A1 | 10/2015 | Scanlon et al. | |

* cited by examiner

*Primary Examiner* — Tsion B Owens
(74) *Attorney, Agent, or Firm* — Haynes and Boone, LLP

(57) ABSTRACT

Various embodiments of the present disclosure may include an imaging device configured to determine appropriate conditions for updating non-uniformity correction (NUC) terms. In certain embodiments, the imaging device may determine when the imaging device is likely not in use and update NUC terms during the times when the imaging device is likely not in use. Data from various position sensors such as gyroscopes, accelerometers, global positioning system receivers, and/or other data may be used to determine when the imaging device is likely not in use. Such position sensors may be coupled to the imaging device and/or may be remote from the imaging device. In certain embodiments, while NUC terms are updated, imaging data obtained may be modified with historical data to provide usable data.

20 Claims, 11 Drawing Sheets

SMART NON-UNIFORMITY CORRECTION SYSTEMS AND METHODS

CROSS-REFERENCE TO RELATED APPLICATIONS

This application claims the benefit of and priority to U.S. Provisional Patent Application No. 62/470,807 filed Mar. 13, 2017 and entitled "SMART NON-UNIFORMITY CORRECTION SYSTEMS AND METHODS," which is incorporated herein by reference in its entirety.

TECHNICAL FIELD

One or more embodiments of the invention relate generally to imaging devices and more particularly to, for example, infrared cameras that are configured to perform non-uniformity correction (NUC).

BACKGROUND

Traditionally, infrared images can be improved using non-uniformity correction (NUC) processes that provide NUC terms used to correct one or more pixels in an image. In such cases, NUC terms may include an offset map and a level, which are used to correct the infrared images.

To maintain accuracy, NUC terms need to be periodically updated, for example, by placing a reference object (e.g., a flag-type shutter) in front of an imager. During updating of the NUC terms, NUC may not be performed and the image shown to a user may be frozen. The freezing of the image may be disturbing to users and may also cause loss of data if no infrared images are collected during the NUC term update procedure due to blockage of the imager by the reference object.

SUMMARY

Systems and methods are disclosed herein for selectively updating NUC terms of an infrared imaging device based on positioning data associated with the device. For example, if the positioning data indicates that the device is not likely to be in use (e.g., having a position and/or orientation not typically associated with active image capture), then the NUC terms may be updated. Otherwise, if the positioning data indicates that the device is likely in use, then the NUC terms may be updated at a later time in order to avoid inadvertent disruption to the image capture process.

In certain embodiments, an infrared camera may be disclosed. The infrared camera may include an image sensor configured to acquire a plurality of image frames of at least a first scene and output image data associated with the plurality of image frames of at least the first scene and a processor, communicatively coupled to the image sensor, and configured to receive positioning data associated with the infrared camera, make a determination, from at least the positioning data, that a likelihood of current use of the infrared camera is lower than a threshold current likelihood, and update non-uniformity correction (NUC) terms of the infrared camera in response to the determination.

In certain other embodiments, a method may be disclosed. The method may include receiving positioning data associated with an infrared camera, making a determination, from at least the positioning data, that a likelihood of current use of the infrared camera is lower than a threshold current likelihood, and updating non-uniformity correction (NUC) terms of the infrared camera in response to the determination.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Techniques and mechanisms are provided in accordance with one or more embodiments for updating of NUC terms in infrared cameras. Systems and techniques are disclosed herein for selectively updating NUC terms of an infrared imaging device based on positioning data associated with the device. For example, if the positioning data indicates that the device is in a position and/or orientation where updating the NUC terms would not be disruptive to image capture operations, the device may update the NUC terms.

The systems and techniques described herein may include an infrared camera that includes one or more positioning sensors. The positioning sensors may be configured to sense an orientation, acceleration, location, and/or other positioning and/or movement parameter of the infrared camera. A controller of the infrared camera may then use the data from the one or more positioning sensors to determine a likelihood that the infrared camera is currently being used (e.g., the frames obtained by the infrared camera is of interest) and/or a likelihood that the infrared camera will be used in the near future (e.g., the frames obtained by the infrared camera in the next 0 to 10 seconds or 10 or more seconds will be of interest). If it is likely that the infrared camera is not currently being used and/or will likely be used in the near future, NUC terms may be updated.

The systems and techniques described herein allow for NUC terms to be updated with minimal disturbance to the user. Such systems and techniques may minimize and/or eliminate subjecting users to frozen images present during NUC term updating as updating of NUC terms may be performed while it is determined that the user is not operating the infrared camera. Accordingly, the disruption from updating NUC terms may be minimized and/or eliminated.

In one example, if the infrared camera is attached to an unmanned aerial vehicle (UAV), updating of NUC terms may be scheduled for when the UAV is outside an area of interest that the infrared camera is imaging. In another example, a user may be operating a handheld infrared imager and the infrared imager may determine if it is hanging upside down on a belt of the user, indicating that the infrared imager is not in use and, accordingly, update NUC terms. In a further example, the infrared imager may be held and/or coupled by a robot and/or operator moving between at least a plurality of positions. The infrared imager may include one or more gyroscopes and/or accelerometers that may sense such movement and may update NUC terms when such movement is detected. NUC terms may be updated during such periods. Such systems, techniques, and examples may be further described herein.

Figure 1:
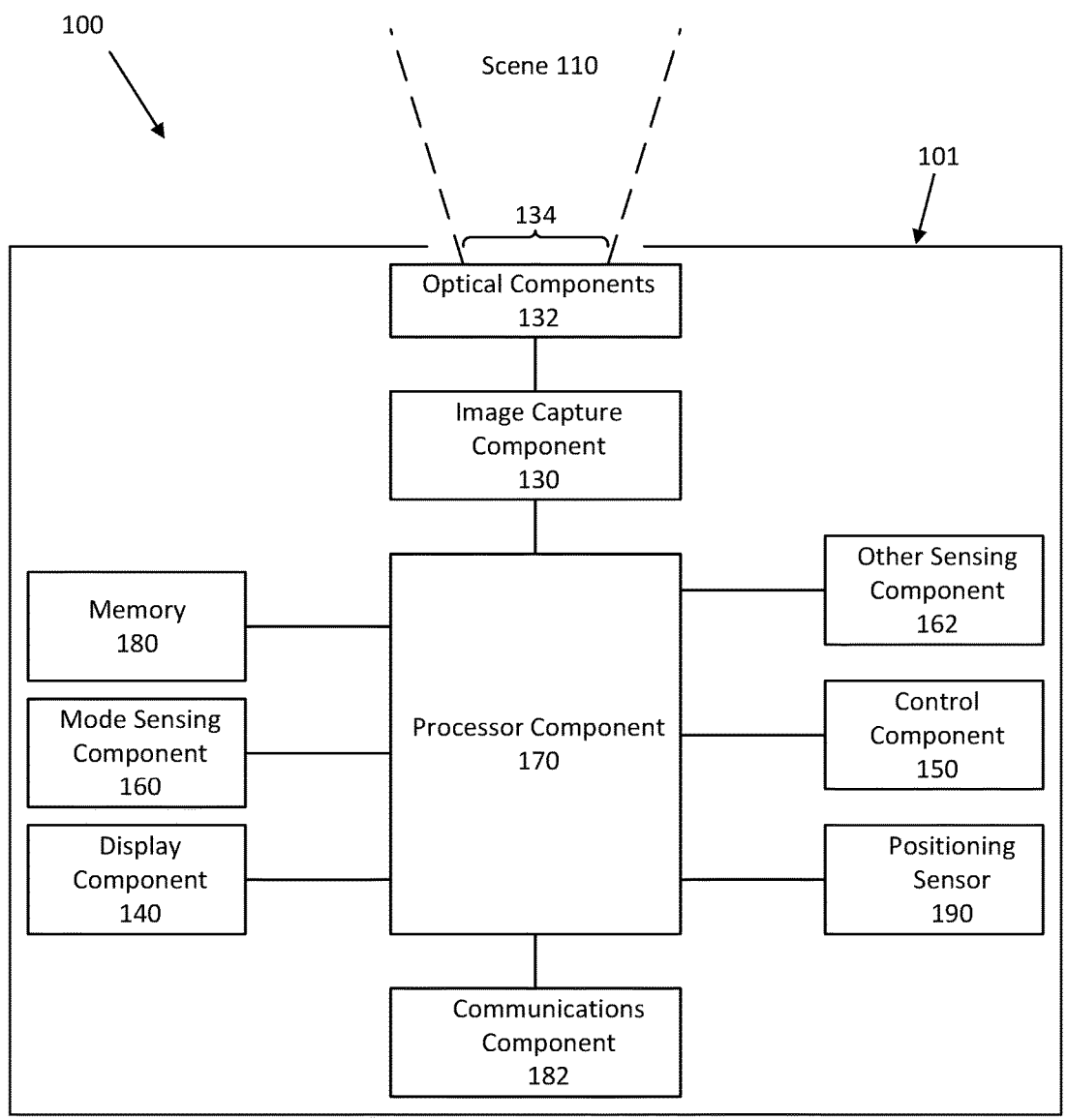
FIG. 1 illustrates a block diagram of an imaging system in accordance with an embodiment of the disclosure.

FIG. 1 illustrates a block diagram of an imaging system in accordance with an embodiment of the disclosure. Imaging device 100 in FIG. 1 may be used to capture and process image frames in accordance with various techniques described herein.

Imaging device 100 includes a processor component 170, a memory 180, an image capture component 130, optical components 132, a mode sensing component 160, a control component 150, a display component 140, a positioning sensor 190 and another sensing component 162.

In various embodiments, the image capture component 130 is configured to capture image frames of, for example, a scene 110 (e.g., a field of view). The image capture component 130 may represent any type of image capturing component which, for example, detects electromagnetic radiation (e.g., irradiance) and provides representative data (e.g., one or more still image frames or video image frames). For example, the image capture component 130 may represent a camera that is directed to detect one or more ranges (e.g., wavebands) of electromagnetic radiation and provide associated image data. Imaging device 100 may include a portable device and may be implemented, for example, as a handheld device and/or coupled, in other examples, to various types of vehicles (e.g., a land-based vehicle, a watercraft, an aircraft, a spacecraft, or other vehicle) or to various types of fixed locations (e.g., a home security mount, a campsite or outdoors mount, or other location) via one or more types of mounts. In still another example, the imaging device 100 may be integrated as part of a non-mobile installation to provide image frames to be stored and/or displayed.

The processor component 170 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or or any other appropriate combination of processing device and/or memory to execute instructions to perform any of the various operations described herein. The processor component 170 may be adapted to interface and communicate with components 130, 140, 150, 160, 162, and 190 to perform method and processing steps as described herein.

Additionally, the processor component 170 may be adapted to receive image signals from image capture component 130, process image signals (e.g., to provide processed image data), store image signals or image data in memory 180, and/or retrieve stored image signals from memory 180. Certain embodiments of the imaging device 100 may include a plurality of image capture components. Such embodiments may capture multiple scenes and the processor component 170 may then create a composite image out of the multiple scenes captured by the plurality of image capture components.

The positioning sensor 190 may be one or more sensors configured to detect a positioning related aspect of the imaging device 100 (e.g., detecting an acceleration, velocity, heading, position, orientation, and/or other positioning aspect of the imaging device 100) and output such data to the processor component 170. As such, the positioning sensor 190 may be, for example, one or more of an accelerometer, a gyroscope, a global positioning data receiver, a hall effect sensor, and/or other linear, angular, or multi-axis sensor that can determine relative and/or absolute acceleration, velocity, heading, orientation, and/or position of the imaging device 100.

In certain embodiments, the positioning sensor 190 may be coupled to the imaging device 100, but other embodiments may include a positioning sensor coupled to another structure such as, for example, an aircraft or UAV that the imaging device 100 is coupled to, and/or may receive positioning data from a secondary positioning data source such as a global positioning data, a sensor that may remotely track the imaging device, and/or other such secondary positioning sources (e.g., data sources that includes route planning information and/or data to track the position of the imaging device 100). Certain such embodiments may receive positioning data from the secondary positioning data source via the communications component 182. The communications component 182 may be a component that receives data via, for example, one or more of a WiFi, Bluetooth, satellite, 3G, 4G, 5G, radio, optical data transmission, wired, and/or other such wired and/or wireless data connections.

Additionally or alternatively, the positioning data may be determined from image data. For example, the processor component 170 may process and/or otherwise analyze the image data to determine the positioning data (e.g., to obtain a determination that the image data corresponds to a particular geographic location based on such processing). Processor component 170 may store the positioning data associated with the geographic location in memory 180 and receive the stored positioning data from memory 180.

The memory 180 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, the processor component 170 is adapted to execute software stored in the memory 180 to perform various methods, processes, and modes of operations in manner as described herein.

Image capture component 130 includes, in one embodiment, one or more sensors (e.g., any type visible light, infrared, or other type of detector, including a detector implemented as part of a focal plane array) for capturing image signals representative of an image, of scene 110. In one embodiment, the sensors of image capture component 130 (e.g., an infrared sensor) provide for representing (e.g., converting) a captured thermal or radiometric image signal of scene 110 as digital data (e.g., via an analog-to-digital converter included as part of the sensor or separate from the sensor as part of imaging device 100). The image capture component 130 may capture radiometric thermal images or videos. The image capture component 130 may be, for example, a bolometer based imaging apparatus (e.g., the image capture component 130 may be an array of sensors).

Optical components 132 may include one or more lenses configured to receive electromagnetic radiation through an aperture 134 in housing 101 and pass the electromagnetic radiation to image capture component 130. Additionally, optical components 132 may include one or more filters (e.g., warm filters, bandpass filters, low pass filters, high pass filters, notch filters, and/or other optical filters) to filter electromagnetic radiation before the radiation reaches the image capture component 130. In certain other embodiments, alternatively or in addition to filters located in front of the electromagnetic radiation, processor component 170 may be configured to filter images captured by the image capture component 130 with, for example, software within processor component 170. In certain other embodiments, the optical filters (e.g., warm filters, bandpass filters, low pass filters, high pass filters, notch filters, and/or other optical filters) may be integrated within the image capture component 130. For embodiments where the image capture component 130 is an array, the optical filters may be integrated within each sensor of the array and/or integrated as one or more optical filters covering a plurality of sensors.

The processor component 170 may be adapted to receive image signals from the image capture component 130, process image signals (e.g., to provide processed image data), store image signals or image data in the memory 180, and/or retrieve stored image signals from the memory 180.

Display component 140 includes, in one embodiment, an image display device (e.g., a liquid crystal display (LCD)) or various other types of generally known video displays or monitors. Processor component 170 may be adapted to display image data and information on display component 140 that the processor component 170 retrieved from the memory 180, processed from image data received from the image capture component 130, or processed from any other source. Display component 140 may include display electronics, which may be utilized by processor component 170 to display image data and information.

In various aspects, display component 140 may be remotely positioned (e.g., housed in a separate housing) from the image capture component 130, and processor component 170 may be adapted to remotely display image data and information on display component 140 via wired or wireless communication with display component 140.

Control component 150 includes, in one embodiment, a user input and/or interface device having one or more user actuated components, such as one or more push buttons, slide bars, rotatable knobs or a keyboard, that are adapted to generate one or more user actuated input control signals. Control component 150 may be adapted to be integrated as part of display component 140 to operate as both a user input device and a display device, such as, for example, a touch screen device adapted to receive input signals from a user touching different parts of the display screen. Processor component 170 may be adapted to sense control input signals from control component 150 and respond to any sensed control input signals received therefrom.

Control component 150 may include, in one embodiment, a control panel unit (e.g., a wired or wireless handheld control unit) having one or more user-activated mechanisms (e.g., buttons, knobs, sliders, or others) adapted to interface with a user and receive user input control signals. In various embodiments, it should be appreciated that the control panel unit may be adapted to include one or more other user-activated mechanisms to provide various other control operations of imaging device 100, such as auto-focus, menu enable and selection, field of view (FoV), brightness, contrast, gain, offset, spatial, temporal, and/or various other features and/or parameters. In other embodiments, a variable gain signal may be adjusted by the user or operator based on a selected mode of operation.

In another embodiment, control component 150 may include a graphical user interface (GUI), which may be integrated as part of display component 140 (e.g., a user actuated touch screen), having one or more images of the user-activated mechanisms (e.g., buttons, knobs, sliders, or others), which are adapted to interface with a user and receive user input control signals via the display component 140. As an example for one or more embodiments as discussed further herein, display component 140 and control component 150 may represent appropriate portions of a smart phone, a tablet, a personal digital assistant (e.g., a wireless, mobile device), a laptop computer, a desktop computer, or other type of device.

Mode sensing component 160 includes, in one embodiment, an application sensor adapted to automatically sense a mode of operation, depending on the sensed application (e.g., intended use or implementation), and provide related information to the processor component 170. In various embodiments, the application sensor may include a mechanical triggering mechanism (e.g., a clamp, clip, hook, switch, push-button, or others), an electronic triggering mechanism (e.g., an electronic switch, push-button, electrical signal, electrical connection, or others), an electro-mechanical triggering mechanism, an electromagnetic triggering mechanism, or some combination thereof. For example for one or more embodiments, mode sensing component 160 senses a mode of operation corresponding to the imaging device 100's intended application based on the type of mount (e.g., accessory or fixture) to which a user has coupled the imaging device 100 (e.g., image capture component 130). Alternatively, the mode of operation may be provided via control component 150 by a user of imaging device 100 (e.g., via display component 140 having a touch screen or other user input representing control component 150).

Furthermore, in accordance with one or more embodiments, a default mode of operation may be provided, such as for example when mode sensing component 160 does not sense a particular mode of operation (e.g., no mount sensed or user selection provided). For example, imaging device 100 may be used in a freeform mode (e.g., handheld with no mount) and the default mode of operation may be set to handheld operation, with the image frames provided wirelessly to a wireless display (e.g., another handheld device with a display, such as a smart phone, or to a vehicle's display).

Mode sensing component 160, in one embodiment, may include a mechanical locking mechanism adapted to secure the imaging device 100 to a vehicle or part thereof. Mode sensing component 160, in one embodiment, may be adapted to receive an electrical signal and/or sense an electrical connection type and/or mechanical mount type and provide a sensing signal to processor component 170. Alternatively or additionally, as discussed herein for one or more embodiments, a user may provide a user input via control component 150 to designate the desired mode (e.g., application) of imaging device 100.

Processor component 170 may be adapted to communicate with mode sensing component 160 (e.g., by receiving sensor information from mode sensing component 160) and image capture component 130 (e.g., by receiving data and information from image capture component 130 and providing and/or receiving command, control, and/or other information to and/or from other components of imaging device 100).

In various embodiments, mode sensing component 160 may be adapted to provide data and information relating to system applications including a handheld implementation and/or coupling implementation associated with various types of vehicles (e.g., a land-based vehicle, a watercraft, an aircraft, a spacecraft, or other vehicle) or stationary applications (e.g., a fixed location, such as on a structure). For example, mode sensing component 160 may be adapted to receive and/or provide information through a satellite, through a local broadcast transmission (e.g., radio frequency), through a mobile or cellular network and/or through information beacons in an infrastructure (e.g., a transportation or highway information beacon infrastructure) or various other wired or wireless techniques (e.g., using various local area or wide area wireless standards).

In another embodiment, imaging device 100 may include one or more other types of sensing components 162, including environmental and/or operational sensors, depending on the sensed application or implementation, which provide information to processor component 170 (e.g., by receiving sensor information from each sensing component 162). In various embodiments, other sensing components 162 may be adapted to provide data and information related to environmental conditions, such as internal and/or external temperature conditions, lighting conditions (e.g., day, night, dusk, and/or dawn), humidity levels, specific weather conditions (e.g., sun, rain, and/or snow), distance (e.g., laser rangefinder), and/or whether a tunnel, a covered parking garage, or some type of enclosure has been entered or exited. Accordingly, other sensing components 162 may include one or more conventional sensors as would be known by those skilled in the art for monitoring various conditions (e.g., environmental conditions) that may have an effect (e.g., on the image appearance) on the data provided by image capture component 130.

In some embodiments, other sensing components 162 may include devices that relay information to processor component 170 via wireless communication. For example, each sensing component 162 may be adapted to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

In various embodiments, components of imaging device 100 may be combined and/or implemented or not, as desired or depending on application requirements, with imaging device 100 representing various operational blocks of a system. For example, processor component 170 may be combined with memory 180, image capture component 130, display component 140, and/or mode sensing component 160. In another example, processor component 170 may be combined with image capture component 130 with only certain operations of processor component 170 performed by circuitry (e.g., a processor, a microprocessor, a microcontroller, a logic device, or other circuitry) within image capture component 130. In still another example, control component 150 may be combined with one or more other components or be remotely connected to at least one other component, such as processor component 170, via a wired or wireless control device so as to provide control signals thereto.

Figure 2:
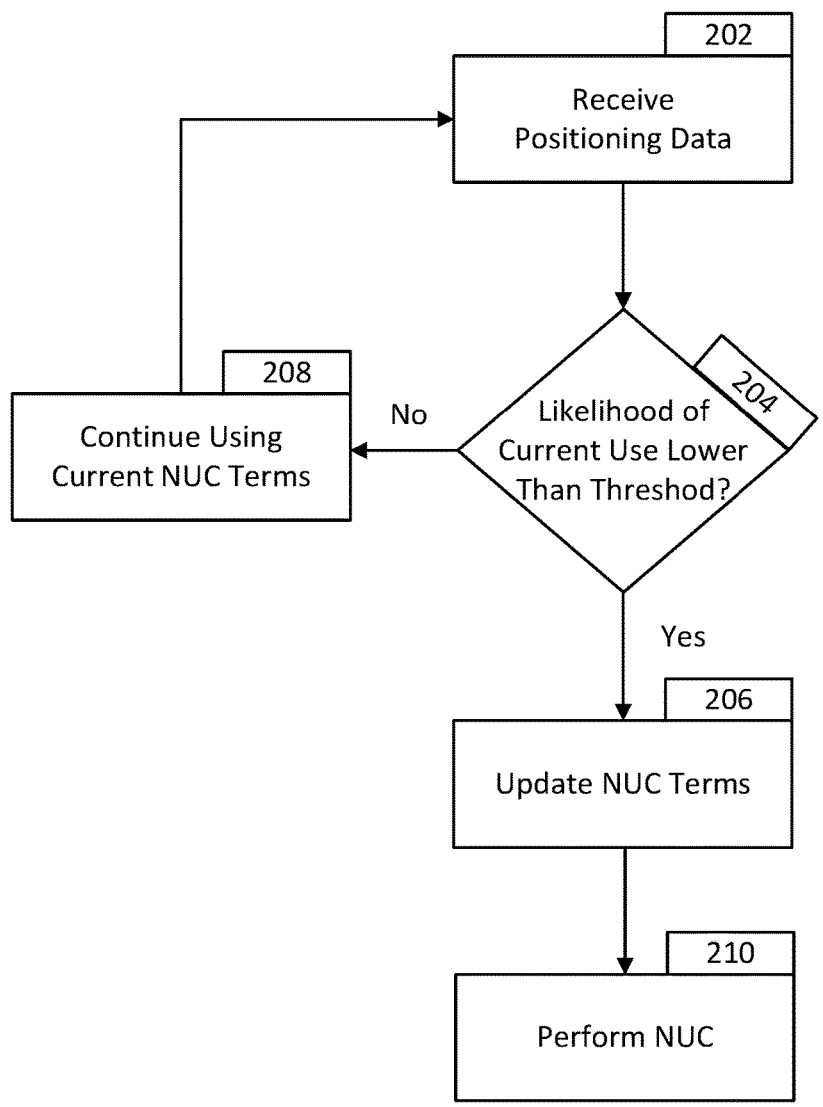
FIG. 2 illustrates a flowchart of a smart NUC technique in accordance with an embodiment of the disclosure.

The imaging device 100 of FIG. 1 may be used to perform a smart NUC technique that minimizes disruption to the user of the imaging device 100. The smart NUC technique discussed herein may be used to determine appropriate times for when NUC terms are updated for the imaging device 100. Such a technique allows for NUC terms to be updated with minimal impact to the user. FIG. 2 illustrates a flowchart of a smart NUC technique in accordance with an embodiment of the disclosure.

In block 202, positioning data may be output by the positioning sensor 190 and received by the processor component 170. The positioning data may, for example, be related to an orientation, position, acceleration, velocity, heading, and/or other factor of the imaging device 100 and maybe output from an accelerometer, a gyroscope, a global positioning data receiver, a hall effect sensor, and/or other linear, angular, or multi-axis sensor that can determine relative and/or absolute acceleration, velocity, heading, orientation, and/or position of the imaging device 100. In various embodiments, different types of positioning data maybe output and received.

In block 204, a likelihood of current use is determined. The likelihood of current use is a determination of whether the imaging device 100 is currently in use and/or is about to be in use. In certain embodiments, the likelihood of current use is determined from, at least, the positioning data. Examples of how various types of positioning data are used to determine the likelihood of current use is illustrated herein. In certain embodiments, the likelihood of current use may be a numerical rating (e.g., from 0 to 100) and/or a yes or no determination calculated by the processor component 170.

The likelihood of current use is then compared to a threshold current likelihood. In certain embodiments, the positioning sensor 190 can provide data indicating a likelihood that the infrared camera of imaging device 100 is currently being used. For example, such an infrared camera can be constantly outputting infrared images and/or video through display component 140 and/or recording data from the image capture component 130, but a user and/or operator may not be watching the display component 140 during certain periods and/or data captured by the image capture component 130 may not be useful during certain periods. Comparing the determined likelihood of current use to the threshold current likelihood may allow determination of when images captured by the image capture component 130 is being watched and/or is useful. Accordingly, for embodiments where the likelihood of current use is an analog output, the threshold current likelihood may also be analog (e.g., for an embodiment where the likelihood of current use is a rating from 0 to 100, the threshold current likelihood may be a rating of 70, with 100 being most likely to be used) while for embodiments where the likelihood of current use is a digital account, the threshold current likelihood may also be digital (e.g., whether the likelihood of current use is a yes or no determination).

If the likelihood of current use is lower than the threshold current likelihood, then the technique may proceed to block 206 and NUC terms may be updated. NUC terms may include an offset map and a level, which are used to correct the infrared images obtained by the optical components 132. The NUC terms may be updated by, for example, placing a reference object such as a black body in front of the aperture 134 and/or the optical component 132. The reference object may be imaged by the optical component 132 and the NUC terms may be determined from imaging the reference object. In certain embodiments, the memory 180 may contain a plurality of NUC term sets and, during the NUC term update in block 206, one of the plurality of NUC term sets may be selected. Other embodiments may determine NUC terms from imaging the reference object.

In certain embodiments, determining and/or updating the NUC terms in block 206 may also include the freezing of images shown in display component 140 and/or showing only the visible portion of the image obtained (e.g., in embodiments where both visible and infrared images are obtained). In certain other embodiments, infrared information of the objects imaged in the visible image may be approximated from historical data and such infrared information determined from historical data may be overlaid on the objects within the visible object. Such techniques may allow the user to at least continue imaging visible objects of a scene and/or object of interest while NUC is performed. There may be an indicator displayed on, for example the display component 140, to allow an operator to know when no infrared information is being recorded due to updating of NUC terms.

After NUC terms are updated in block 206, NUC may be performed on images obtained by the image capture component 130 using the updated NUC terms in block 210. In certain embodiments, NUC terms may be updated regularly or frequently (e.g., periodically between, for example, every 10 seconds or less, every 30 seconds or less, every minute or less, and/or every minute or longer) if the likelihood of current use is lower than the threshold current likelihood. Otherwise, if the likelihood of current use is higher than the threshold current likelihood, the NUC may continue to be performed using the current NUC terms in block 208.

Figure 3A:
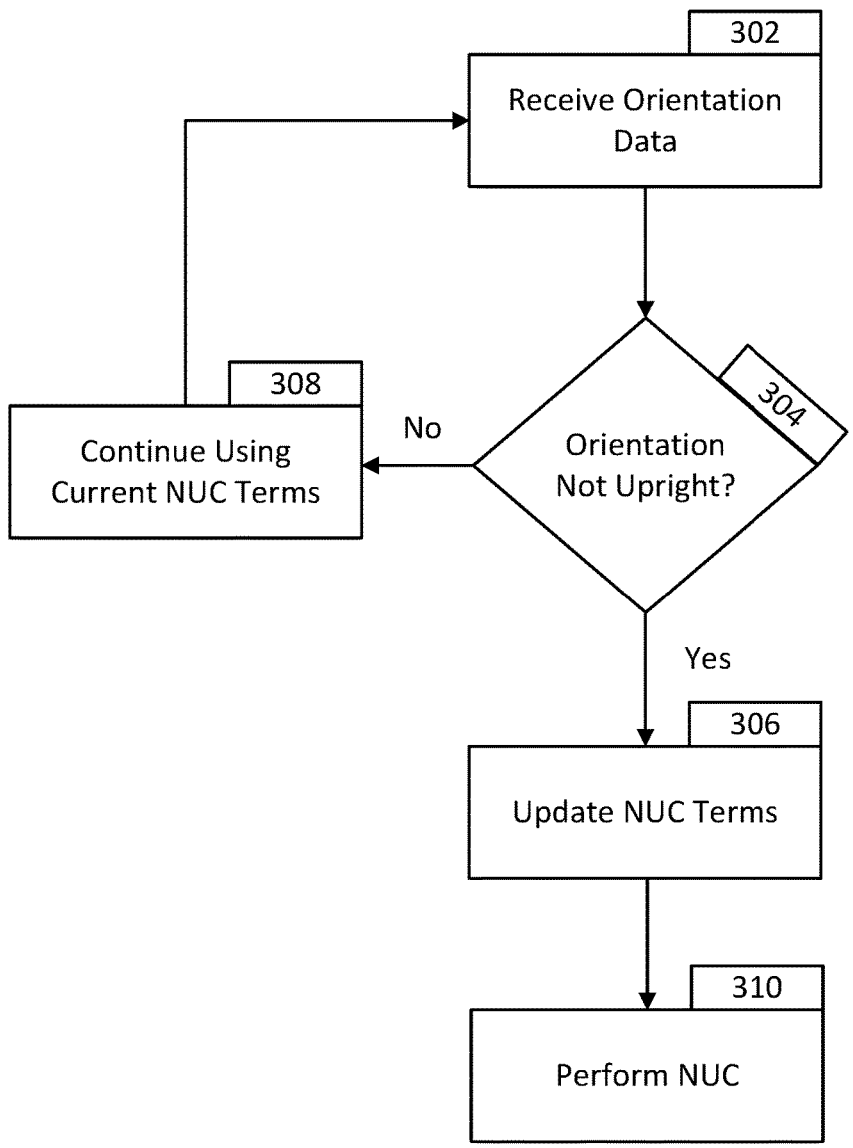
FIG. 3A illustrates a flowchart of another smart NUC technique in accordance with an embodiment of the disclosure.

FIG. 3A illustrates a flowchart of another smart NUC technique in accordance with an embodiment of the disclosure. In block 302, the positioning data received may include, at least, orientation data of the imaging device. The orientation data may be data obtained by, at least, a gyroscope, acceleration, and/or other sensor that can determine an orientation of the imaging device and/or the image capture component. In certain such embodiments, the orientation data may indicate whether the imaging device and/or the imagine capture component is upright, tilted, inverted, and/or another orientation.

In block 304, the orientation data is received by the processor component and an orientation of the imaging device and/or the image capture component is determined. As such, the processor component can determine from, at least, the orientation data, whether the imaging device and/or the image capture component is upright, tilted, inverted, and/or another orientation.

In certain embodiments, such as for hand held imaging devices, the imaging device, when not in use, is not held up (e.g., held upright or substantially upright) and, when the imaging device is not held up, the NUC terms may be updated. While certain embodiments may determine the orientation of the imaging device from data from a gyroscope, accelerometer, and/or other sensors, other embodiments can determine the orientation of the imaging device directly from images captured.

If it is determined that the imaging device 100 is not upright, the technique may proceed to block 308. Otherwise, the technique may proceed to block 306 and then proceed to block 310. Blocks 306, 308, and 310 may be similar to blocks 206, 208, and 210 of FIG. 2.

Figure 3B:
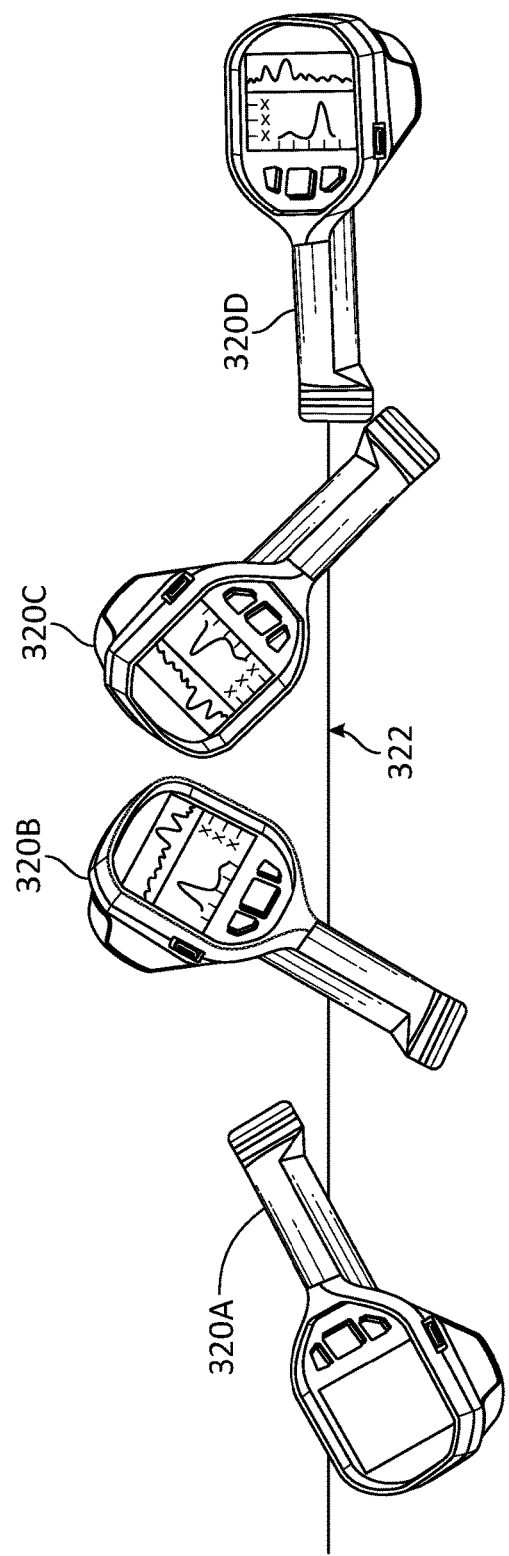
FIGS. 3B-D illustrate examples of various orientations in accordance with embodiments of the disclosure.
Figure 3C:
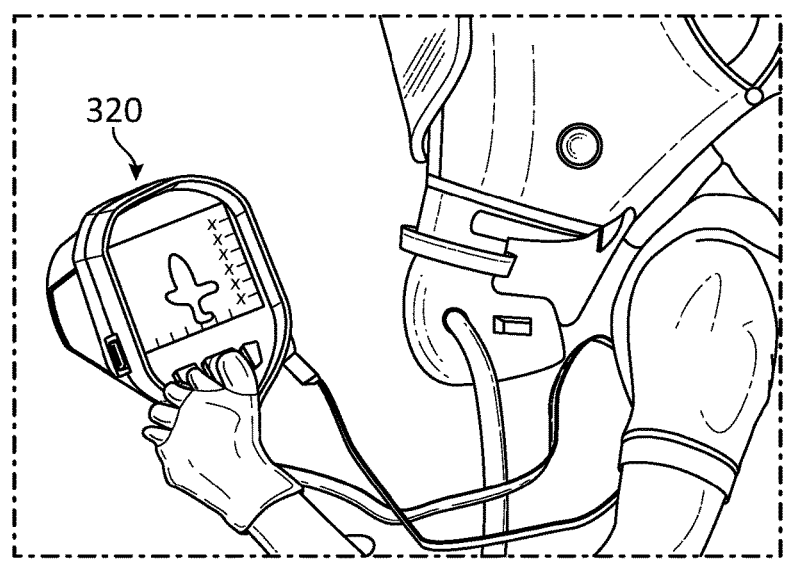
Figure 3D:

FIGS. 3B-D illustrate examples of various orientations in accordance with embodiments of the disclosure. FIG. 3B illustrates imaging devices 320A-D. Each of the imaging devices 320A-D may include one or more orientation sensors that can determine the orientation (e.g., upright, upside down, tilted to the side, 30 degrees from upright, and/or another orientation) of the imaging device that it is coupled to.

In FIG. 3B, each of the imaging devices 320A-D are configured so that their respective orientation sensors output data directed to whether the imaging device is upright. If it is determined that the data indicates that the imaging device is tilted in an orientation past that of horizontal line 322, then the likelihood of current use is determined to be lower than the threshold current likelihood and the NUC terms may be updated. The horizontal line 322 may indicate that the imaging device is tilted 90 degrees from an upright orientation (e.g., held straight up).

As shown in FIG. 3B, if a center point of the display component of the imaging device is above the horizontal line 322 (e.g., less than 90 degrees from the upright orientation), then the controller may determine that the imaging device is likely in use and/or that the likelihood of current use is greater than the threshold current likelihood and thus may prevent NUC terms from being updated and/or display an image on the display component of the scene being captured by the image capture component of the imaging device. Imaging devices 320B-D are in such orientations.

If the center point of the display component of the imaging device is below the horizontal line 322 (e.g., more than 90 degrees from the upright orientation), then the controller may determine that the imaging device is likely not in use and/or that the likelihood of current use is lower than the threshold current likelihood and thus allow NUC terms to be updated and/or turn off the display component. Imaging device 320A is in such an orientation.

In certain embodiments, the orientation of the imaging device may be one of a plurality of factors used to calculate the likelihood of current use. In such embodiments, the plurality of factors may be balanced and a final likelihood of current use calculated from the plurality of factors. As such, for example, each of the plurality of factors may be associated with a numerical rating. The numerical ratings can be modified (e.g., with multipliers) and a final likelihood of current use can be calculated.

FIG. 3C illustrates an example situation where the imaging device 320 determines that the likelihood of current use is higher than the threshold current likelihood. In FIG. 3C, the imaging device 320 is being held upright. An orientation sensor within the imaging device 320 detects that the imaging device 320 is being held upright and, thus, the likelihood of current use is higher than the threshold current likelihood. Accordingly, NUC terms may not be updated and the display component is displaying an image captured by the image capture component.

FIG. 3D illustrates an example situation where the imaging device 320 determines that the likelihood of current use is lower than the threshold current likelihood. In FIG. 3D, the imaging device 320 is clipped to the belt of the user and is thus hanging upside down. An orientation sensor within the imaging device 320 detects that the imaging device 320 is upside down and, thus, the likelihood of current use is lower than the threshold current likelihood. Accordingly, the imaging device 320 may be updating the NUC terms and the display component is blank.

Figure 4:
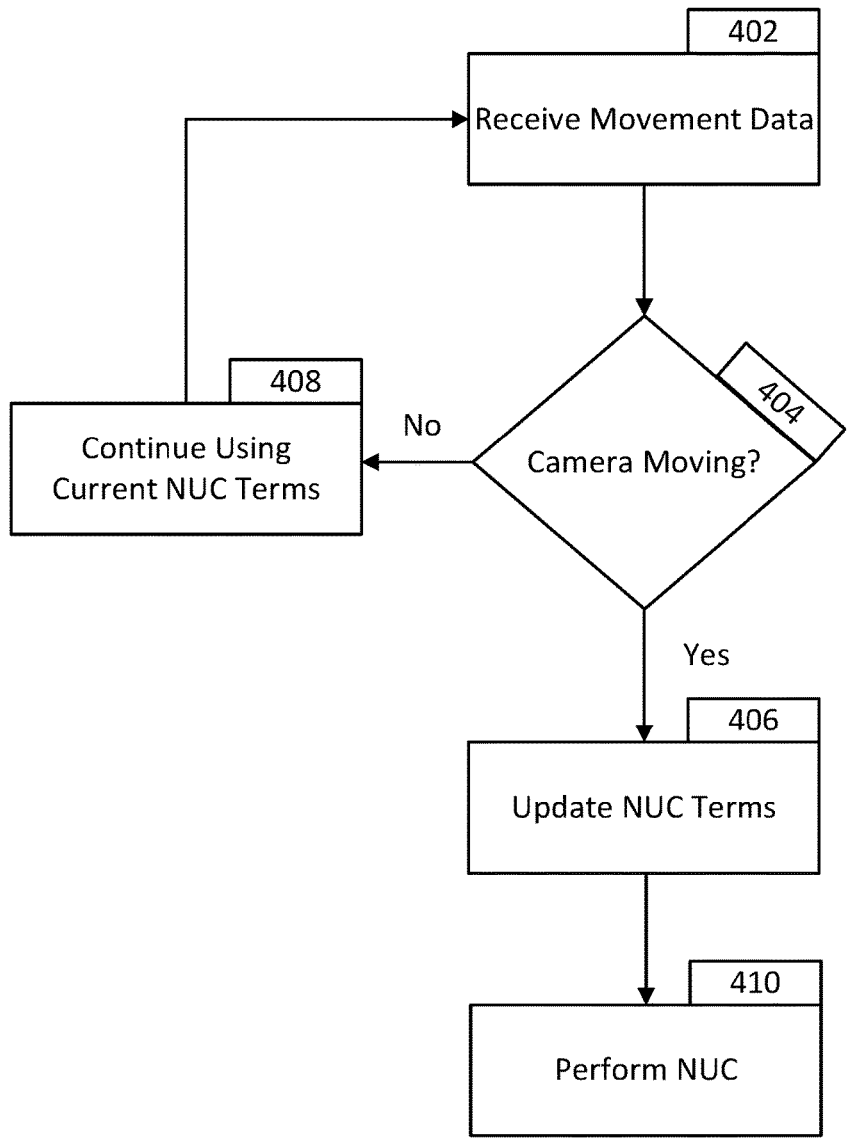
FIG. 4 illustrates a flowchart of yet another smart NUC technique in accordance with an embodiment of the disclosure.

FIG. 4 illustrates a flowchart of yet another smart NUC technique in accordance with an embodiment of the disclosure. In block 402, the positioning data received may include, at least, movement data of the imaging device. The movement data may be data obtained by, at least, an accelerometer, velocity sensor, and/or other sensor that can determine linear and/or angular acceleration, velocity, jerk, and/or heading of the imaging device and/or the image capture component. In certain such embodiments, the movement data may indicate whether the imaging device and/or the imagine capture component is stationary, moving, accelerating, and/or changing directions.

In block 404, the movement data is received by the processor component and whether the imaging device and/or the image capture component is stationary, moving, accelerating, and/or changing directions determined. In certain embodiments, when the imaging device is determined to be accelerating and/or moving above a threshold amount for more than a threshold period of time (e.g., more than 1 second, more than 3 seconds, more than 5 seconds, or more than 10 seconds), the controller may determine that the imaging device is not in use.

If it is determined that the imaging device is stationary, the technique may proceed to block 308. Otherwise, the technique may proceed to block 406 and then proceed to block 410. Blocks 406, 408, and 410 may be similar to blocks 206, 208, and 210 of FIG. 2.

Figure 5A:
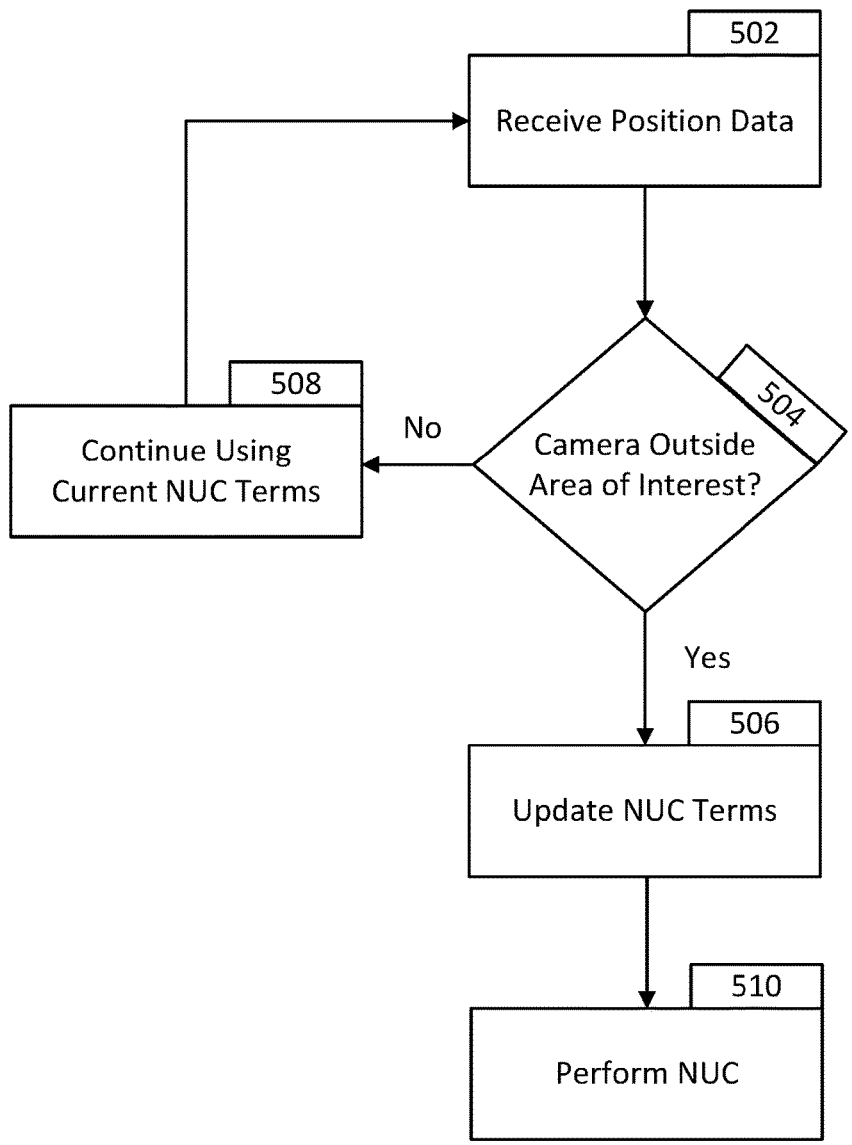
FIG. 5A illustrates a flowchart of a further smart NUC technique in accordance with an embodiment of the disclosure.

FIG. 5A illustrates a flowchart of a further smart NUC technique in accordance with an embodiment of the disclosure. In block 502, the positioning data received may include, at least, a position of the imaging device. The positioning data may be data from a global positioning receiver, a component configured to triangulate signals (e.g., cellphone tower signals), and/or other such component configured to determine a local and/or global position of the imaging device.

In block 504, the position of the imaging device determined from the position data may be compared to an area of interest to determine if the imaging device is within the area of interest. If it is determined that the imaging device is stationary, the technique may proceed to block 508. Otherwise, the technique may proceed to block 506 and then proceed to block 510. Blocks 506, 508, and 510 may be similar to blocks 206, 208, and 210 of FIG. 2.

Figure 5B:
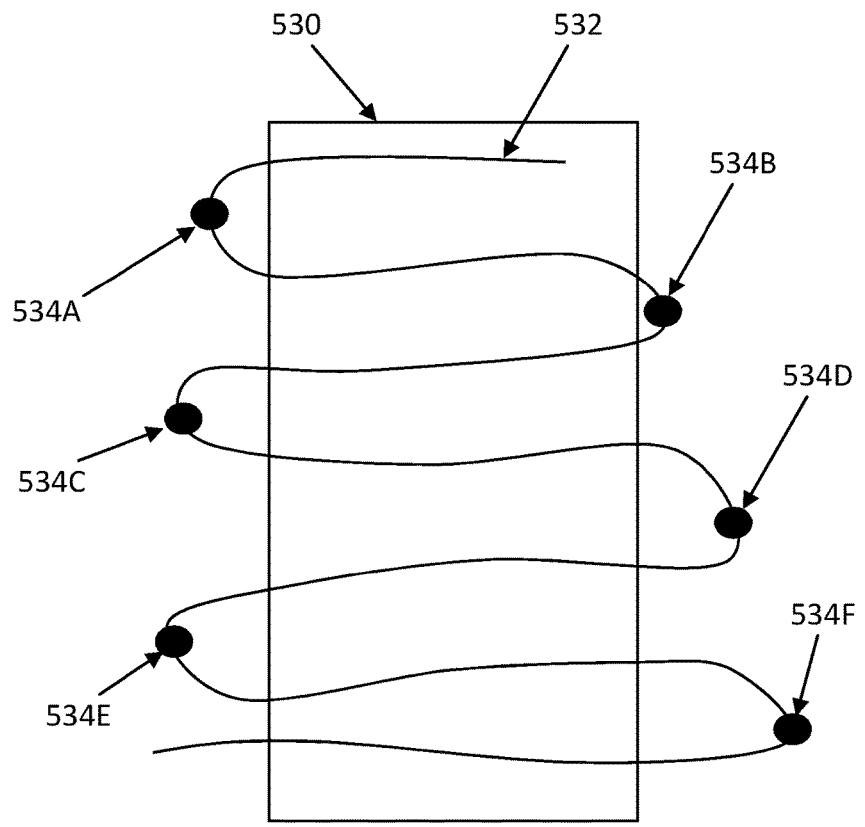
FIG. 5B illustrates an example of performing the smart NUC technique of FIG. 5A in accordance with an embodiment of the disclosure.

FIG. 5B illustrates an example of performing the smart NUC technique of FIG. 5A in accordance with an embodiment of the disclosure. FIG. 5B illustrates a flight path 532 of a vehicle (e.g., an unmanned air vehicle or UAV) with an imaging device coupled to the vehicle. The UAV and/or imaging device may be configured to an area of interest 530. As such, when the controller determines that the UAV and/or imaging device is within the area of interest 530, the imaging device may image the scene and output image data to a memory of the imaging device and/or communicated to a secondary device (e.g., a memory not coupled to the UAV such as an off-site server and/or a mobile device). NUC terms may not be updated while the UAV and/or the imaging device are determined to be within the area of interest 530 and/or the imaging device is determined to be imaging at least a portion of the area of interest 530.

When the UAV and/or the imaging device are determined to be outside the area of interest 530 and/or the imaging device is determined to not be imaging a portion of the area of interest 530, the NUC terms may be updated. For example, when the UAV and/or the imaging device are in one of positions 534A-F, the NUC terms may be updated.

In certain other embodiments, the UAV and/or the imaging device may determine when movement of the UAV meets certain pre-determined conditions. Such conditions may be determined from data output by one or more sensors of the UAV and/or the imaging device such as gyroscopes, accelerometers, global positioning receivers, image data of the imaging device, and/or other such data. Additionally, such conditions may include conditions such as if the UAV is accelerating and/or decelerating, if the UAV is turning, if the UAV is moving, and/or other such conditions that indicate when update of the NUC terms is appropriate.

In certain embodiments, an operator may pre-define a set route. If the route is pre-defined, NUC terms may be updated when the imaging device is in a portion of the route where no images are required to be taken. If there is no pre-defined route and/or the imaging device is unaware of when images are required to be taken (e.g., the imaging device requires inputs from a controller of the UAV for when images are required), various sensors may be used to detect when/where a picture is to be taken and when/where the camera is available for updating of NUC terms. Additionally, the imaging device may automatically determine a route based on historical behavior. As such, images taken by the imaging device within a set period and/or global positioning data may be used to determine if the UAV is traveling along a historical route that the UAV has traveled along before.

Figure 6:
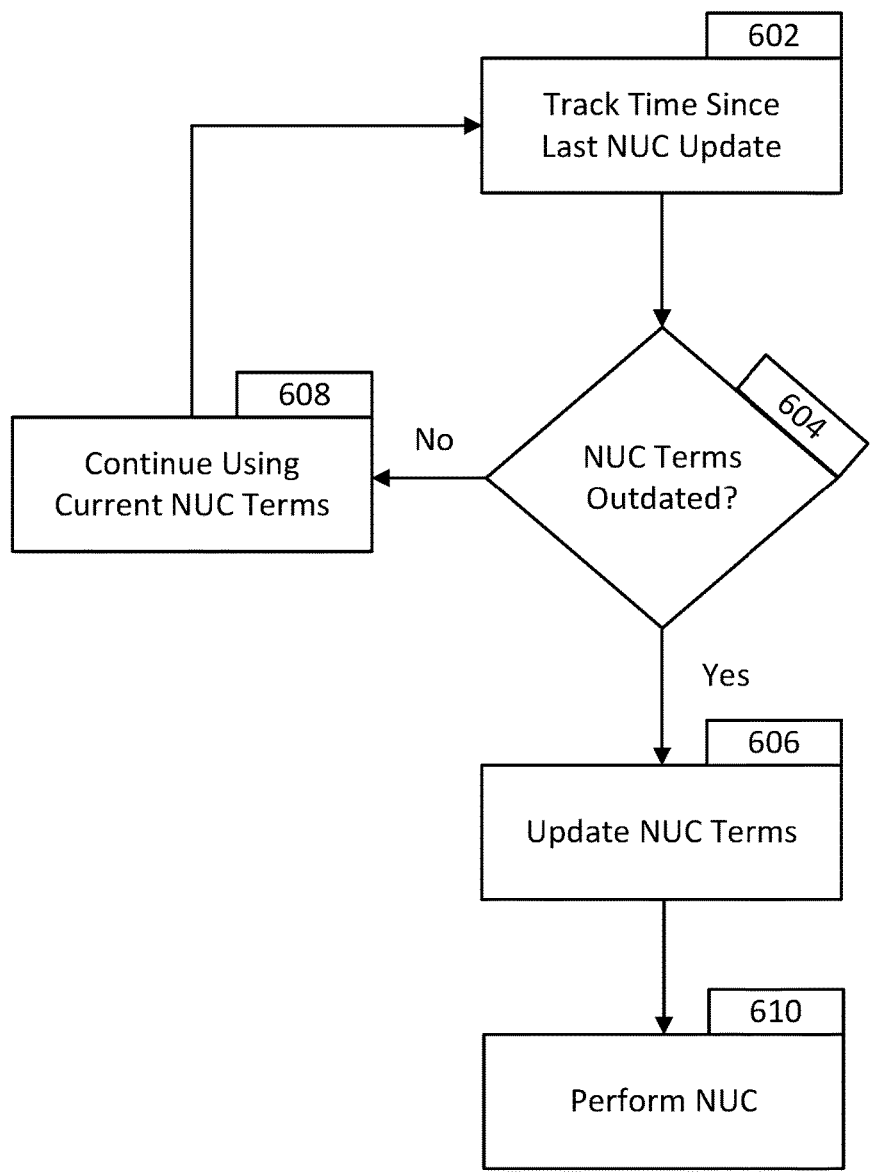
FIG. 6 illustrates a flowchart of another smart NUC technique in accordance with an embodiment of the disclosure.

FIG. 6 illustrates a flowchart of another smart NUC technique in accordance with an embodiment of the disclosure. The technique illustrated in FIG. 6 may be performed concurrently with one or more other techniques described herein. The technique in FIG. 6 may track the amount of time since the last NUC term update (e.g., since any of blocks 206, 306, 406, and/or 506 described herein). If the amount of time is greater than a maximum NUC timespan, NUC terms may be updated even if one or more of the other techniques performed indicate that the imaging device is operational and/or in use. If NUC terms are updated according to a determination by the technique illustrated in FIG. 6, previous image data (e.g., stored in memory 180 as historical imaging data) may be displayed to the user and/or used to create a composite image (e.g., merged with visual imaging data) to minimize disruption to the user of the imaging device.

In block 602, the time since the last NUC term update may be tracked. In such embodiments, the NUC terms may be updated if a set amount of time has elapsed since the last NUC term update, regardless of the likelihood of current use (e.g., may be updated even if the likelihood of current use is higher than the threshold current likelihood).

In block 604, the time since the last NUC term update may be compared against a maximum NUC timespan. If the time since the last NUC term update is equal to or greater than the maximum NUC timespan, the NUC terms may be considered outdated. If it is determined that the NUC terms are not outdated, the technique may proceed to block 608. Otherwise, the technique may proceed to block 606 and then proceed to block 610. Blocks 606, 608, and 610 may be similar to blocks 206, 208, and 210 of FIG. 2. In certain embodiments, the technique illustrated in FIG. 6 may be performed concurrent to other techniques that calculate a likelihood of current use (e.g., the techniques illustrated in FIGS. 2-5B).

Figure 7:
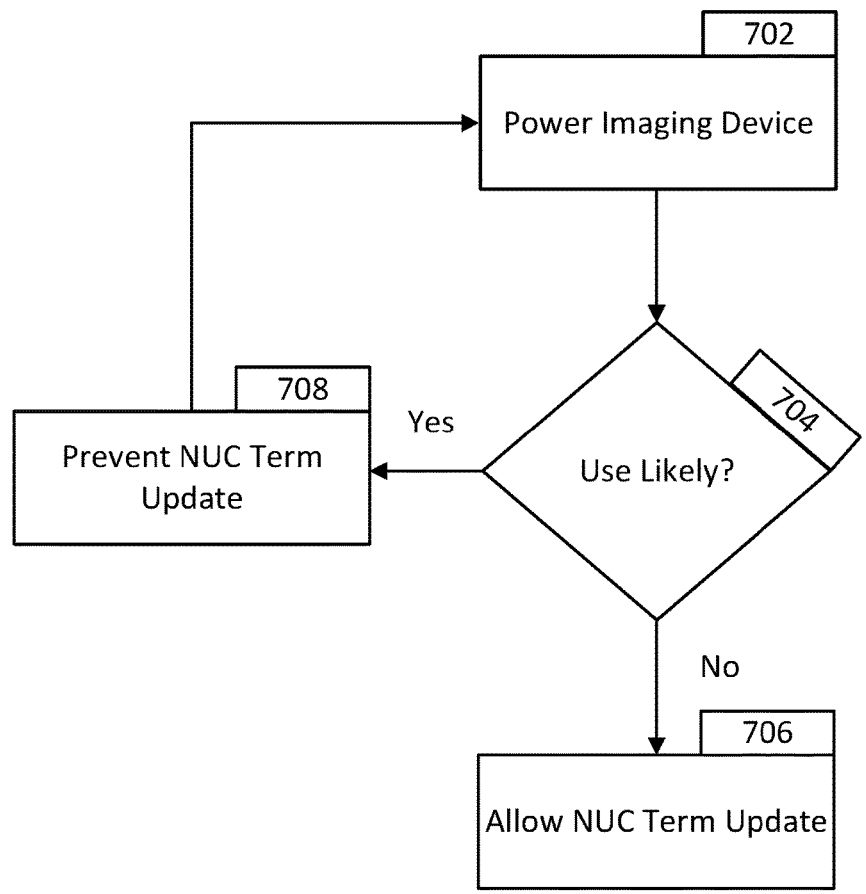
FIG. 7 illustrates a flowchart of a further smart NUC technique in accordance with an embodiment of the disclosure.

FIG. 7 illustrates a flowchart of a further smart NUC technique in accordance with an embodiment of the disclosure. In FIG. 7, the controller of the imaging device may determine when the imaging device is being used and/or likely to be used in the near future (e.g., within the next five seconds or less, within the next ten seconds or less, within the next minute or less, or without the next minute or more).

In block 702, the imaging device may be powered. As such, the controller and/or image capture component of the imaging device may be operational. In block 704, whether the imaging device is currently being used and/or is likely to be used may be determined.

Whether the imaging device is currently being used may be determined through any of the techniques described herein (e.g., as described in FIGS. 2-6B). As such, a likelihood of current use may be calculated and compared to a threshold current likelihood.

Whether the imaging device is likely to be used may be determined through the use of a modified likelihood of current use. One, some, or all of the factors used to determine such a modified likelihood of current use may be directed to whether the imaging device is likely to be used in the near future. For example, such a modified likelihood of current use may include factors indicating whether the imaging device is being moved to a position where operation is likely (e.g., indicates that movement of the imaging device is slowing down, that the imaging device is being moved to an area of interest, and/or another such position), an orientation where operation is likely (e.g., being moved to an upright position), and/or other factors indicating that usage of the imaging device is likely in the near future.

For example, accelerometers, gyroscopes, and/or global positioning signals may be used to detect whether the camera is moving between positions (e.g., defined positions where one or more images are to be captured) or whether it is stationary. In certain embodiments, one or more of such conditions may indicate that the imaging device will be used very soon. Additionally, the controller may also interpret the scene viewed by the imaging device and, based on what the imaging device is capturing, determine whether the imaging device is to be used and/or is to be used soon.

For example, the image may be compared to historical images and, if the images are similar, a determination may be made that the imaging device is being moved back to an area of interest. If the controller determines that the imaging device is to be used soon, the NUC terms may be updated before such images are captured to prevent the updating of NUC terms from disrupting the capturing of images.

Additionally or alternatively, the imaging device may use accelerometers and/or gyroscopes for sensing movement. A user may walk between various positions where pictures are to be taken. Such a user may often leave the imaging device hanging upside down (e.g., from his belt) during movement from one position to another. Using accelerometers and/or gyroscopes in the imaging device, the controller may detect when the imaging device is hanging upside down and update the NUC terms while the imaging device is hanging upside down. Additionally, the controller may be configured to detect that the imaging device is beginning to be moved to an upright position and the NUC terms may be updated right before the camera is moved fully upright and ready to be used. Such a configuration may be useful as NUC terms may be updated in only a few seconds, and certain imaging devices may often require a few seconds to position properly before they are ready to be used.

Additionally, in certain instances, NUC terms may be updated during inconvenient times (e.g., when the imaging device is being used). For example, if the NUC terms are outdated, they may be updated even as a user is operating the imaging device. Normally, during updating of the NUC terms, the image shown in the display component is frozen and, thus, no infrared information can be collected and/or communicated to the user during update of the NUC terms. When NUC terms are updated during capturing of an image, the operator may lose track of where the imaging device is pointed towards, since the display component may no longer show the scene that the imaging device is pointed towards. Techniques disclosed herein allow for NUC terms to be updated before and/or after the capturing of such images. However, in certain situations, NUC terms may need to be updated while images are being captured. In such situations, the imaging device may be configured to keep displaying images while the NUC terms are updated. For example, the visible image and/or another image may be shown where details of the image are taken from a visible image (e.g., from a visual imager) and the infrared information within the image is approximated based on historical data or not shown. Such historical data may be stored within the memory of the infrared imager and may be substituted for the few seconds or less required to update NUC terms. Other examples may infer the infrared information from various detected items within the image from the historical data. Displaying the visible image, alone or blended with infrared information from historical data, allows the user to continue pointing the imaging device in the right direction during the NUC term update procedure. In certain examples, that historical data is being used can be signaled to the user (e.g., through a graphic on the display component).

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. An infrared camera comprising:
   an image sensor configured to acquire a plurality of image frames of at least a first scene and output image data associated with the plurality of image frames of at least the first scene; and a processor, communicatively coupled to the image sensor, and configured to:
receive positioning data associated with the infrared camera,
make a determination, from at least the positioning data, that a likelihood of current use of the infrared camera is lower than a threshold current likelihood, and
update non-uniformity correction (NUC) terms of the infrared camera in response to the determination.

2. The infrared camera of claim 1, further comprising:
a positioning sensor configured to output the positioning data to the processor, wherein the positioning sensor is a gyroscope, an accelerometer, and/or a global positioning receiver.

3. The infrared camera of claim 1, wherein the processor is configured to receive the positioning data from a secondary positioning data source comprising at least one of a positioning sensor coupled to a vehicle, a remote secondary data source, and/or a memory of the infrared camera.

4. The infrared camera of claim 1, wherein the processor is configured to determine the positioning data from the image data, store the positioning data in a memory of the infrared camera, and receive the positioning data from the memory.

5. The infrared camera of claim 1, wherein the processor is configured to receive the positioning data from an orientation sensor, wherein the positioning data is directed to an orientation of the infrared camera, and wherein the determination comprises a determination that the infrared camera is in a non-upright orientation.

6. The infrared camera of claim 1, wherein the processor is configured to receive the positioning data from a motion sensor, wherein the positioning data is directed to motion of the infrared camera, and wherein the determination comprises a determination that the camera is in motion.

7. The infrared camera of claim 1, wherein the processor is configured to receive the positioning data from a location sensor, wherein the positioning data is directed to a location of the infrared camera, and wherein the determination comprises a determination that the infrared camera is located outside of an area of interest.

8. The infrared camera of claim 1, wherein the processor is further configured to:
make a determination that a likelihood of future use of the infrared camera is higher than a threshold future likelihood; and
prevent updating of the NUC terms in response to the determination of the likelihood of future use.

9. The infrared camera of claim 1, wherein the processor is further configured to:
make a determination, from at least the positioning data, that the likelihood of current use of the infrared camera is higher than the threshold current likelihood;
make a determination that a time period greater than a maximum NUC timespan has elapsed since a previous NUC term update; and
update the NUC terms in response to the determination that the time period greater than the maximum NUC timespan has elapsed.

10. The infrared camera of claim 1, wherein the processor is further configured to:
receive the image data from the image sensor;
store the image data as historical image data; and
display an approximated image from the historical image data when the NUC terms are updating.

11. A method comprising:
receiving positioning data associated with an infrared camera;
making a determination, from at least the positioning data, that a likelihood of current use of the infrared camera is lower than a threshold current likelihood; and
updating non-uniformity correction (NUC) terms of the infrared camera in response to the determination.

12. The method of claim 11, wherein the positioning data is received from a positioning sensor coupled to the infrared camera and configured to output the positioning data associated with the camera to the processor, wherein the positioning sensor is a gyroscope, an accelerometer, and/or a global positioning receiver.

13. The method of claim 11, wherein the positioning data is received from a secondary positioning data source comprising at least one of a positioning sensor coupled to a vehicle, a remote secondary data source, and/or a memory of the infrared camera.

14. The method of claim 11, further comprising:
determining the positioning data from image data; and
storing the positioning data in a memory;
wherein the receiving positioning data comprises receiving the positioning data from the memory.

15. The method of claim 11, wherein the positioning data is directed to an orientation of the infrared camera, and wherein the determination comprises a determination that the infrared camera is in a non-upright orientation.

16. The method of claim 11, wherein the positioning data is directed to motion of the infrared camera, and wherein the determination comprises a determination that the camera is in motion.

17. The method of claim 11, wherein the positioning data is directed to a location of the infrared camera, and wherein the determination comprises a determination that the infrared camera is located outside of an area of interest.

18. The method of claim 11, further comprising:
making a determination that a likelihood of future use of the infrared camera is higher than a threshold future likelihood; and
preventing the updating of the NUC terms in response to the determination of the likelihood of future use.

19. The method of claim 11, further comprising:
making a determination, from at least the positioning data, that the likelihood of current use of the infrared camera is higher than the threshold current likelihood;
making a determination that a time period greater than a maximum NUC timespan has elapsed since a previous NUC term update; and
updating the NUC terms in response to the determination that the time period greater than the maximum NUC timespan has elapsed.

20. The method of claim 11, further comprising:
receiving image data from an image sensor of the infrared camera;
storing the image data as historical image data; and
displaying an approximated image from the historical image data when the NUC terms are updating.

* * * * *